(12) United States Patent
Marins et al.

(10) Patent No.: US 9,774,649 B2
(45) Date of Patent: Sep. 26, 2017

(54) SYSTEM AND METHOD FOR PROVIDING A CONTENT DISTRIBUTION NETWORK

(71) Applicant: Apple Inc., Cupertino, CA (US)

(72) Inventors: Sergejs Marins, Toronto (CA); Grant Ritchie, Toronto (CA)

(73) Assignee: Apple Inc., Cupertino, CA (US)

( * ) Notice: Subject to any disclaimer, the term of this patent is extended or adjusted under 35 U.S.C. 154(b) by 243 days.

(21) Appl. No.: 14/148,615

(22) Filed: Jan. 6, 2014

(65) Prior Publication Data
US 2014/0195644 A1    Jul. 10, 2014

Related U.S. Application Data

(63) Continuation of application No. PCT/CA2012/000637, filed on Jul. 9, 2012.

(60) Provisional application No. 61/505,484, filed on Jul. 7, 2011.

(51) Int. Cl.
*H04L 29/06*    (2006.01)
*H04L 12/18*    (2006.01)
*H04L 12/24*    (2006.01)

(52) U.S. Cl.
CPC ........ *H04L 65/601* (2013.01); *H04L 12/1859* (2013.01); *H04L 41/509* (2013.01)

(58) Field of Classification Search
None
See application file for complete search history.

(56) References Cited

U.S. PATENT DOCUMENTS

| 7,599,938 | B1* | 10/2009 | Harrison, Jr. ..... | G06F 17/30867 |
| | | | | 705/12 |
| 2002/0184223 | A1 | 12/2002 | Miura | |
| 2004/0204958 | A1* | 10/2004 | Perkins ................. | G06Q 30/02 |
| | | | | 705/1.1 |
| 2005/0027721 | A1* | 2/2005 | Saenz .................... | G06Q 30/02 |
| 2005/0055275 | A1* | 3/2005 | Newman ................ | G06Q 30/02 |
| | | | | 705/14.41 |

(Continued)

FOREIGN PATENT DOCUMENTS

GB        2 377 510        1/2003

OTHER PUBLICATIONS

International Search Report of the International Searching Authority, PCT Application Serial No. PCT/CA2012/000637, Oct. 30, 2012, 5 pp.

(Continued)

*Primary Examiner* — Greg C Bengzon
(74) *Attorney, Agent, or Firm* — Fish & Richardson P.C.

(57) ABSTRACT

The present disclosure relates to a system and method for providing a content distribution network. In an embodiment, the system and method helps organizations share content as a content source, and manage multiple feeds of content from various other content sources, keeping specific information private while integrating shared updates. For example, the content may be local business information kept by numerous different organizations for their own locality. By sharing this location information through a shared content distribution network, the organizations are able to update the location information of their users and obtain a higher quality of data. In an embodiment, an organization may prioritize the content in a private feed in order to override crowd sourced external data.

18 Claims, 4 Drawing Sheets

(56) References Cited

U.S. PATENT DOCUMENTS

| | | | | |
|---|---|---|---|---|
| 2005/0102292 | A1* | 5/2005 | Tamayo | G06F 17/30539 |
| 2007/0245002 | A1 | 10/2007 | Nguyen et al. | |
| 2008/0167957 | A1* | 7/2008 | Steelberg | G06Q 30/02 705/14.64 |
| 2008/0263056 | A1 | 10/2008 | Murray et al. | |
| 2009/0125413 | A1 | 5/2009 | Lechevalier et al. | |
| 2009/0216577 | A1* | 8/2009 | Killebrew | G06Q 30/02 705/7.32 |
| 2009/0254971 | A1* | 10/2009 | Herz | G06Q 10/10 726/1 |
| 2010/0299274 | A1* | 11/2010 | Rappaport | G06Q 10/067 705/313 |
| 2011/0125779 | A1 | 5/2011 | Fiero | |
| 2011/0173180 | A1* | 7/2011 | Gurumurthy | G06F 17/3089 707/711 |
| 2011/0173214 | A1* | 7/2011 | Karim | G06F 17/3002 707/754 |
| 2011/0213670 | A1* | 9/2011 | Strutton | G06Q 30/02 705/14.73 |
| 2011/0238670 | A1* | 9/2011 | Mercuri | G06Q 30/0282 707/748 |
| 2011/0295722 | A1* | 12/2011 | Reisman | G06Q 30/0201 705/27.1 |
| 2011/0313779 | A1* | 12/2011 | Herzog | G06Q 10/10 705/1.1 |
| 2011/0314092 | A1* | 12/2011 | Lunt | G06F 17/30876 709/203 |
| 2011/0320246 | A1* | 12/2011 | Tietzen | G06Q 30/02 705/14.4 |
| 2012/0095828 | A1* | 4/2012 | Evankovich | G06Q 10/00 705/14.49 |
| 2012/0130960 | A1* | 5/2012 | Nerger | G06F 17/30536 707/690 |
| 2012/0158732 | A1* | 6/2012 | Mital | G06Q 10/06 707/741 |
| 2012/0158954 | A1* | 6/2012 | Heffernan | H04L 43/04 709/224 |
| 2012/0203651 | A1* | 8/2012 | Leggatt | G06F 17/30268 705/26.3 |
| 2012/0232914 | A1* | 9/2012 | Chodavarapu | G06F 19/3493 705/1.1 |
| 2012/0296845 | A1* | 11/2012 | Andrews | G06F 17/2785 705/36 R |
| 2013/0110978 | A1* | 5/2013 | Gordon | H04N 21/2665 709/218 |
| 2013/0166569 | A1* | 6/2013 | Navas | G06F 17/30516 707/747 |
| 2013/0282699 | A1* | 10/2013 | Feng | G06F 17/3053 707/722 |
| 2013/0311219 | A1* | 11/2013 | Green | G06Q 10/10 705/7.14 |
| 2014/0040301 | A1* | 2/2014 | Chadha | G06F 17/30536 707/765 |
| 2014/0047505 | A1* | 2/2014 | Stibel | G06Q 10/107 726/2 |
| 2014/0089798 | A1* | 3/2014 | Evans | G06F 17/30017 715/716 |
| 2014/0136328 | A1* | 5/2014 | Abhyanker | G06Q 10/087 705/14.58 |
| 2014/0143004 | A1* | 5/2014 | Abhyanker | G06Q 10/087 705/7.19 |
| 2014/0180788 | A1* | 6/2014 | George | G06Q 30/0269 705/14.41 |
| 2014/0189013 | A1* | 7/2014 | Abhyanker | G06Q 10/087 709/204 |
| 2014/0222577 | A1* | 8/2014 | Abhyanker | H04W 4/22 705/14.58 |
| 2014/0228060 | A1* | 8/2014 | Abhyanker | G06Q 10/087 455/457 |
| 2014/0236723 | A1* | 8/2014 | Abhyanker | G06Q 10/087 705/14.57 |
| 2014/0237053 | A1* | 8/2014 | Abhyanker | G06Q 30/0261 709/204 |
| 2015/0026260 | A1* | 1/2015 | Worthley | G06Q 10/10 709/204 |
| 2015/0073929 | A1* | 3/2015 | Psota | G06Q 50/28 705/26.2 |
| 2015/0154560 | A1* | 6/2015 | Eastlund | G06Q 10/10 705/342 |

OTHER PUBLICATIONS

International Preliminary Report on Patentability and Written Opinion of the International Search Authority, PCT/CA2012/000637, mailed Jan. 16, 2014, 14 pp.

\* cited by examiner

SYSTEM AND METHOD FOR PROVIDING A CONTENT DISTRIBUTION NETWORK

PRIORITY BASIS

The present application is a continuation of, and claims priority under 35 USC 120 to, international application PCT/CA2012/000637, filed Jul. 9, 2012, which claims priority to U.S. Patent Application No. 61/505,484, filed on Jul. 7, 2011, the entire contents of each of which are incorporated herein by reference.

FIELD OF THE INVENTION

This invention relates generally to a content distribution network, and more particularly to systems and methods for providing a content distribution network shared by multiple content providers.

BACKGROUND

At the present time, organizations from many different industries generate valuable information used for business purposes. Local business data is but one example. For example: travel agents use information about hotels and also about businesses that cater to tourists to help travellers plan vacations; banks and other financial institutions use information about local businesses to help focus their marketing activities; and mobile search applications need the latest contact information about each business so that their users may navigate accurately to locations offering specific products or services.

Generally speaking each organization has unique business needs that require them to use data from different sources, or generate data on their own (sometimes because of gaps in available third party information). Managing and merging this information can be a significant burden for organizations, usually requiring significant numbers of employees skilled in data management, and a technology and database infrastructure, for processing and managing this information.

A significant problem is that, in many domains, information becomes less accurate over time. For example in connection with business directory information, businesses close, open or change their profile details, resulting in information becoming stale. Approximately 2% or 300,000 businesses open or close every month in the United States, while 10% or 1.5 million change their profile information. Staying up-to-date on a global basis requires extensive resources and still information is out of date. To maintain the value of their local business information, it is important for these organizations to keep their information updated and accurate. There is also a need for more efficient ways to find and fix errors, and to enhance their data from other sources.

As a related problem, with organizations managing their local data independently, fragmentation can develop as each organization develops its own formats and standards. Differing standards and formats makes it become difficult to distribute information to all simultaneously. This prevents creators of valuable content relating to local business (like photos, videos, review, etc.), or the local businesses themselves from broadcasting their content and information to these organizations. For example, it is currently difficult for a media company to distribute its photos and videos of hotels to all travel agencies, or for local businesses to distribute their accurate contact information and product inventory to all mobile search applications.

A solution is needed that addresses the shortcomings of the prior art.

SUMMARY

The present disclosure relates to a system and method for providing a content distribution network.

In an embodiment, the system helps organizations share content as a content source, and manage multiple feeds of content from various other content sources, keeping specific information private while integrating shared updates.

In a first aspect of the invention, a computer system implemented method for distributing content using a content distribution network is provided, the method comprising: (a) one or more rights holders using an Internet connected computer platform to establish one or more content repositories on a database or databases linked to the computer platform; (b) the computer platform configuring the content repositories using a universal content interface implemented to the computer platform so as to map the content repositories to a common meta information structure; (c) the one or more rights holders defining one or more subscription rules for platform users to subscribe to feeds established by operation of the computer platform ("subscribers"); and (d) one or more subscribers initiating the computer platform to automatically configure one or more feeds for their use based on the subscription rules, wherein the feeds may be based on one or more content repositories from one or more rights holders, configured automatically by the computer platform for consumption by the subscribers.

In another aspect the method comprises the step of the rights holders or their designees updating their content repositories from time to time, and these updates being automatically integrated to any subscriber feeds based on the content repositories.

In another aspect, the platform users can share content through the computer platform, despite their respective content repositories being subject to different schema, by mapping their respective content repositories to the universal content interface.

In yet another aspect, there is a further step of platform clients using one or more tools that are part of the computer platform to create, manage and update content records that are part of the content repositories.

In a still further aspect there is a further step of creating for each rights holder an account linked to the database for tracking transactions based on consumption of content or broadcasting of content through the computer platform, and processing transactions based on one or more transaction rules associated with the account.

In another aspect, there is a further step of managing one or more crowd source campaigns for creating, managing or updating content using a crowd utility linked to the computer platform.

In yet another aspect, there is a further step of configuring a dashboard for each user of the computer platform to manage their content creation, management, and updating activities through the computer platform, and subscriptions to feeds and broadcast of feeds through the computer platform.

In a still other aspect, computer platform enables users to: merge different databases or files into an integrated content repository; correct or otherwise modify content; and combine one or more content repositories, or segment of one or more content repositories to form one or more feeds for broadcasting through the computer platform.

In one aspect of the method, there is a further step of two or more users establishing a content sharing partnership and associated transaction arrangements through the computer platform, and upon activation of the content sharing partnership on the computer platform, the computer platform automatically implementing the content sharing and transaction arrangements made as part of the content sharing partnership.

In another aspect, the content repository includes one or more of (a) databases or files licensed form third parties; (b) publicly available databases or files, including publicly available content compilations obtained through the computer platform; (c) content sources created by the user, including content sources created and managed using one or more tools that are part of the computer platform.

In another aspect, a computer system for distributing content using a content distribution network is provided, characterized in that the computer system comprises: (a) a database linked to one or more computers, operable to store one or more content repositories associated with one or more rights holders; and (b) one or more computer implemented utilities for enabling: (i) configuring the content repositories using a universal content interface implemented to the computer platform so as to map the content repositories to a common meta information structure; (ii) defining one or more subscription rules for platform users to subscribe to one or more feeds configured by operation of the computer platform ("subscribers"); and (iii) based on a request from one or more subscribers automatically configuring one or more feeds for their use based on the subscription rules, wherein the feeds may be based on one or more content repositories from one or more rights holders configured automatically for consumption by the subscribers.

In another aspect, the one or more computer implemented utilities further enable the rights holders or their designees to update their content repositories from time to time using the computer platform, and these updates being automatically integrated to any subscriber's feeds based on the content repositories.

In a still other aspect the computer system users can share content through the platform, despite the fact that their respective content repositories are subject to different schema by mapping their respective content repositories to the universal content interface.

In yet another aspect, the computer system further comprises a data record manager that enables platform clients to map their content repositories inbound from the universal content interface, and outbound to the universal content interface.

In a still other aspect, the computer system comprises a data exchange utility that enables computer system users to define one or more rules governing the distribution of feeds based on the computer system user's content repository or content repositories.

In yet another aspect, the computer system also includes a transaction utility that creates for each computer system user an account linked to the database for tracking transactions based on consumption of feeds or broadcasting of feeds through the computer system, and processing transactions and crediting/debiting the account based on one or more transaction rules.

In a still other aspect, the computer system includes an analytics tool that enables computer system users to access analytics regarding demand for content via the content distribution network, and based on such analytics optimize their content creation, management, and distribution activities.

In another aspect, the computer system comprises a crowd module that enables the creation and management of one or more crowd source campaigns for creating, managing or updating content using a crowd utility that is made accessible to crowd users linked to the computer system.

In yet another aspect, the computer system comprises a dashboard configured for each computer system user to enable management of their content creation, content mapping, management, and updating activities through the computer system, and subscriptions to feeds and broadcast of feeds through the computer system.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF THE DRAWINGS

The invention will be better understood and objects of the invention will become apparent when consideration is given to the following detailed description thereof. Such description makes reference to the annexed drawings wherein.

Figure 1:
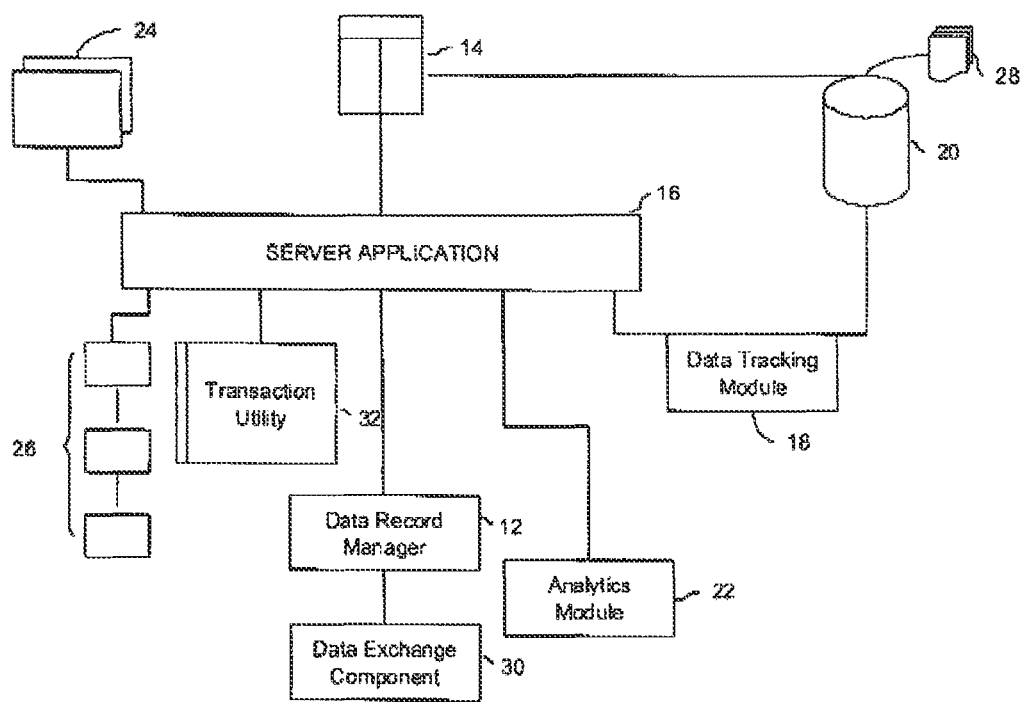
FIG. 1 is a system diagram illustrating the components, in one representative implementation thereof.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

In one aspect, an Internet implemented computer system or platform (10) is provided that provides a content distribution network. The platform (10) includes a number of novel and innovative tools for managing a plurality of data sources, and sharing data sources selectively with others. The present invention provides a new solution and technology platform for management of data sources as part of a cloud network based, managed, and dedicated data store that through the content distribution network enabled by the platform (10) can utilize in a dynamic way data sources available from third parties.

Definitions

Repositories

In one aspect of the platform (10) of the present invention, the server application (16) includes functionality for creating what are referred to as "repositories" for platform clients. "Repositories" are similar to private file directories that can contain profile data in a particular schema. The platform (10), in one implementation, enables platform clients to use platform generated repositories to store and manage various databases and files that platform clients may already have. Significantly, the platform (10) is configured to enable platform clients to maintain native schema or formats already used in their existing databases or files. This makes it easier to upload content for the repositories (8), and also may make it easier for platform clients to use the platform (10) and then reintegrate contents of repositories (8) in a master database for example. Also, platform clients can continue to query the contents of repositories (8) with usual queries used by platform clients in their databases. The platform (10) is configured to enable the importation of databases and files in a variety of formats or file structures.

The present invention contemplates a variety of different content repositories including but not limited to data repositories.

See related comments below under the heading "Mapping Process".

Content Sources or Data Sources

"Content Sources" refer to sources of content that are accessible to a platform client. These include content repositories that may belong to a platform client, or feeds to which the platform cheat has subscribed. The platform (10) is configured so that platform clients may add unlimited repositories or feeds to a content source.

Feeds

Feeds contain data selected from by a platform client from one or more of content sources. Feeds include one or more data repositories of a platform client (or a subset thereof) and optionally one or more feeds or feeds of another platform client. Feeds can be used to synchronize your local databases with updates, to distribute data to others, or to create detailed composite profiles from a platform client's various sources. Feeds created by operation of the platform (10) can be visualized and exported in any repository schema.

In one implementation of the present invention, feeds support the following features:

Field priority: if a platform client trusts a particular data source (for example be s/he believes that it is reliable in a particular area), the data source can be prioritized over other possible data sources, including on an attribute by attribute level. A data source can also be prioritized based on specific content attributes.

Profile filter: A platform client might want their feed to include only restaurants in New York with free WiFi.

Feed subscription type: A platform client can set whether the feed is for their own internal use or whether they want others to be able to subscribe to it. They can set whether subscription approvals are automatic if others agree to their terms of use, or whether they prefer to review and approve requests manually. They can also choose whether the feed appears in platform's Feed Catalog (referred to below).

The platform (10) provides new and innovative online marketplace for content, and the ability for organizations to outsource activities related to the creation and management of content, and that allows multiple platform clients to establish and modify (on an as needed basis) partnerships around building and maintaining content sources.

The advantages of the platform (10) are explained in relation to building and maintaining data repositories containing business directory data, however, as explained further below the content distribution network of the present invention may be utilized in connection with other types of content such as medical records, company records (public and private), consumer profiles and so on. The platform (10) provides an effective means to create and manage various distributed relationships in regards to creation of content and access to content.

One aspect of the platform (10) is a data record manager (12), which is configured to enable the subscription to one or more feeds. A skilled reader will appreciate that the term "feed" does not imply that all data stream parameters normally associated with feeds are required. Rather, in the present content distribution network, content subscribers can subscribe to feeds provided by others, and also make their feeds available to others, and attach terms wad conditions to both. As explained previously, a feed can also include one or more of a client's repositories or a subset thereof. These relationships and associated terms and conditions are easily configured through the web implemented server application (16) of the present invention, whereby data flows between contributors of data and subscribers to data are made subject to the relationships structured, and associated terms and conditions, automatically.

In one aspect of the invention, the platform (10) and specifically operations of the data record manager (12) are based on a novel and innovative framework or data record structure that is further described below.

The system and method will now be described in more detail with reference to FIG. 1, which shows an illustrative computer system architecture in accordance with an embodiment. As shown, the computer system architecture includes a web server (14), which may be implemented as one or more network-connected servers. The web server (14) is linked to a server application or web application (16) which may also be implemented as an application repository. Server application (16) includes a series of utilities, implemented to the web server (14) to enable the platform (10) to provide the content distribution network of the present invention.

In one implementation of the present invention, the server application (16) includes the data record manager (12), and the data record manager includes or is linked to a data tracking module (18) to keep track of consumption of feeds by the various platform clients through the platform (10). For example, the data tracking module (18) may track which content source the data came from and at what time. The data tracking module (18) may further track which content subscriber accessed the data and when. The tracking information may further include tracking to the level of a content subscribes end users as well.

The system architecture may also include an analytics module (22) to analyze data sourcing and subscription activities and trends to reveal intelligence regarding for example the nature and scope of demand for data. The analytics module (22) may include a variety of analytical tools or may embody various computer implemented analytical methods, so as to enable platform clients to identify business opportunities and based on this direct their data creation or data verification/correction in a way that maximizes revenue. A reporting utility (not shown) may be linked to the analytics module (22) so as to create one or more reports based on output from the analytics module (22) that may be used by platform clients to plan their content creation or management activities through the platform. Also, the analytics module (22) may be used as a decision support mechanism to assist platform clients in determining pricing for their content feeds based on demand for their content, as gauged using output from the analytics module (22).

The data record manager (12) also enables authorized users to establish content subscriptions to feeds from one or more content sources, as further explained below. The data record manager (12) may be associated with a dashboard (24) that is personalized by the server application (16) based on sign-in information provided by each registered user associated with a platform client. The dashboard (24) may be implemented as a series of web screens that enable the registered user to access the various functions of the platform (10), including those described in this disclosure, for managing data including (A) engaging in various data processing and cleaning activities, (B) broadcasting data feeds to other platform clients, and (C) subscribing to data feeds from other platform clients, as further explained below. The dashboard (24) allows registered users to access a series of data management tools (26) described below, and also view the platform client's various inbound and outbound data feeds that are part of the platform client's dedicated content repository, as established on the database (20).

In one implementation of the invention, the dashboard (24) includes a feed catalogue which may be used by platform clients to find various content feeds available through the platform (10), for example for addition to a data source. The dashboard may include functionality for identifying feeds likely to be of interest to a platform client based for example on compatibility with the platform client's existing data sources. The dashboard (24) may also include functionality that allows a platform user to discover available feeds and obtain associated information such as price and currency.

The platform (10) enables subscribers to the platform or platform clients (for example publishers and online agencies) to manage, clean, and share their information sources. Platform clients typically utilize a data store that may include data from a variety of data sources. For example, a content source used by Company A may have various different components for example (a) one or more data repositories or feeds licensed from third parties, (b) one or more publicly available data repositories or feeds, (c) and one or more data repositories that Company A may have compiled on their own.

The content repositories compiled by Company A may be for filling gaps in commercially available data stores, or for example to correct mistakes in either third party feeds, or publicly available data repositories or feeds. As shown in FIG. 1, one aspect of the present invention is a server application (106). The server application (106) may be implemented as an application repository, and may connect to a cloud network (not shown). FIG. 1 shows a representative implementation of the platform (10) of the present invention.

In one implementation of the present invention, the web application (106) provides a series of tools (26) that enable platform clients to manage their content sources, including (a) merge different content repositories into an integrated data store, (b) correct data (such as identifying and eliminating duplicates), (c) segment the data repository or repositories and any additional feeds into feeds by merging data records or data record groups to form merged data streams (feeds), or to parse groups of data records into subsets of the data record groups (also feeds), (d) receive notifications from others of suggested data changes, and/or (e) translate their data into other languages.

The tools (26) may include the various functions that may be available now or in the future through various database management tools for example.

Figure 2:
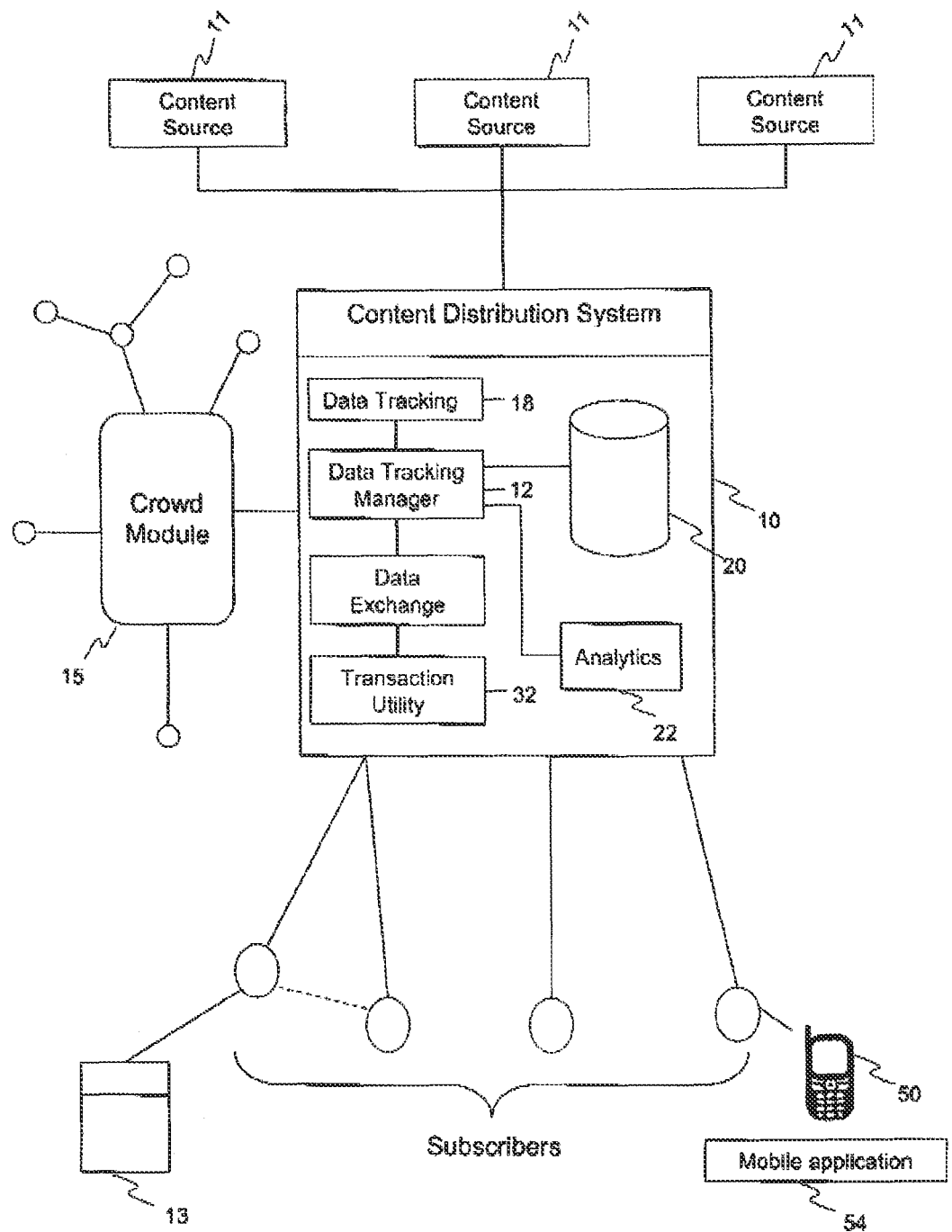
FIG. 2 is further system diagram illustrating the computer system of the present invention, as implemented as between multiple content sources and multiple subscribers.

FIG. 2 provides an alternative view of the computer system of the present invention. The content distribution system (10) is connected to multiple content sources (11), and enables various subscribers to subscribe to feeds from the content distribution system (10), which may be segmented from one or more content sources (11) using the various tools of the content distribution system (10). Subscribers may define relationships between themselves using the content distribution system (10). Subscribers may access the content distribution system (10) from a network-connected computer (13) of any type. The content distribution system (10) enables subscribers to manage their content activities (including for example subscribing to feeds and engaging in various data management activities) in the cloud. As described in greater detail below, subscribers may also access platform features from a mobile device (50) using a mobile application (54) of the present invention that is configured to intemperate with the content distribution system (10).

Crowd Module

Also as illustrated in FIG. 2, the content distribution system (10) may also include a crowd module (15). The crowd utility or module (15) provides a mechanism for subscribers or content sources (a skilled reader will appreciate that a platform client may be both a content source for other platform clients and a subscriber to content feeds from other subscribers) to invoke a crowd for the purposes of fixing errors or verifying information. In one aspect of the invention, the data record manager (12), using the crow module (15), can enable the design and implementation of campaigns that leverage the crowd for the compilation of data, or correction of data. For example, based on the present invention, suggestions from the crowd may be automatically received by a platform client and displayed in connection with the relevant data records (28).

The crowd module (15) may implement aspects of the platform described in international application number PCT/CA2011/000462 filed on Apr. 26, 2011 (the "PCT Application"), as an extension to the content distribution network of the present invention.

The crowd module (15), in one implementation, leverages a crowd sourcing model so that data records (28) may be completed or verified in part or completely by individuals that are part of the crowd community fostered and managed using the crowd module (15).

The platform (10) may also benefit from a system and method for accumulation and verification of trust, as disclosed in co-pending U.S. patent application Ser. No. 13/462,368.

Content Profile Structure

Significantly, the platform (10) is based on a common content profile structure or framework that is highly configurable by platform clients, for example to alter display of information, field formats, functions linked to particular fields, and so on. In other words, platform clients may use the tools (26) to configure various custom content profile formats, which must be implemented in the backend of the server.

In one aspect of the invention, the platform (10) utilizes a unique and innovative content profile structure. Each content profile or data record (28) maps to a common content profile structure or universal data interface that is essentially a profile consisting of meta data that maps to associated information in a unique and innovative way. The universal data interface contains a series of attributes (consisting of meta data) that combines all of the possible attributes of a data record (28). Each attribute may be associated with rules of validation. The rules of validation relate to rules before data will be accepted to a data record (28) by the data record manager (12) of the platform (10).

Significantly, the data record manager (12) has been configured, and the profiles that implement the data records (28) have been designed, such that the data record (28) embodies through a significant number of attributes an extensive set of possible attributes for any given domain or context where data records (28) may be used in connection with the platform (10). As a result, a single content profile structure or universal data interface may be used to address a very large number of different data record formats that various platform clients may require for different purposes. In other words, the data record (28) has been designed to cover a broad range of possible attributes, yet affording various advantages of use of a single data record format for many different applications, as further explained below.

The data record (28) has also been designed so that each of the attributes can be associated with one or more other attributes of the universal data interface. These associations enable the definition of various child or parent relationships between different attributes. For example, child attributes may be locked down pending correction of a parent attribute. This aspect enables the flexible segmentation of information without the need of modification of data records (28), or extraction of information from data records in order to support various data management operations. A skilled reader of this disclosure will understand that the approach taken to the configuration of data records in the platform (10) is very different from prior art approaches.

Prior art data records are normally a data form that includes a plurality of fields, where each field contains information, and the data records as a whole constitutes a data structure that is stored and accessed to access information contained in the data record. Modifications of attributes, or relationships between attributes (such as parent-child relationships), or changes to information entered to fields, typically requires modification of the data record. This can pose limitations on flexibility in the sense that in prior art solutions there are often limitations on the nature or scope of changes that may be made without introducing errors or requiring substantial processing. The state of the art for data source management solutions prior to the invention, is largely responsible for the fact that organizations have had to take a silo based approach to management of their content sources, where there is little opportunity to explore and implement collaborations with other organizations in a dynamic way in areas where there is concordance of interest. This has contributed to the significant cost of information, for example business directory information, and also the well known commonality of mistakes in such information.

The present invention, as explained below, takes a unique and innovative approach that enables organizations to define and manage collaborative relationships as it relates to merger of information from different sources, and also providing access to content sources in exchange for feeds of access fees processed by operation of the platform (10). In effect, the platform (10) gathers together a series of novel tools and combines some existing tools to provide a scalable Internet based platform that gives effect to a new market for content sources, with the various efficiencies that this functionality provides.

The attributes may also be associated with permissions that may relate to for example (i) user types who may make changes to information associated with particular attributes, (ii) nature of changes that may be made.

In one aspect of the invention, data is not stored to a data record in the present invention, rather a data record (28) is a collection of attributes (constituting meta data), where one or more of the attributes of a universal data interface are linked to associated information to form a data record (28) which is, stored to the database (20). A data record (28) therefore contains meta information for mapping content to the various attributes of the universal data interface and also instructions for retrieving associated information from the database (20). This arrangement enables the segmentation of information without the need for example to modify data records or extract information. This results in a reduction in processing requirements and makes granular configuration of a data store from multiple sources, including on an attribute by attribute level not only possible but feasible.

Another implication is that the display of a data record (23) is distinct from the underlying meta data linked to the information. The same data, record (28) can be displayed in a number of different formats without the need to translate information or extract information. In addition, using the data record (28) of the present invention, the same information (such as business directory information) can be made available in numerous languages without the extensive translation requirements that would normally apply. The form in which the attributes are displayed may be translated. The attributes themselves are not language dependent. Directory information (for example address, phone number) is often not language dependent. This way translation of records may be readily generated with much less work required than is necessary with prior art solutions.

In other words, the data record (28) of the present invention functions as a framework, through the flexible content profile structure or universal data interface that is made part of the data record manager (12), as explained below.

A platform client may have a data source that includes restaurant information. The platform client wants to modify an information category namely "restaurants" such that data records when displayed will show whether or not a "restaurant" has a wood burning pizza oven. Attributes may be updated and this new aspect may be automatically added to the affected data records (28), without the need to edit the database (20).

All information contributed by a specific resource across any type of data record (28) may be deleted easily, for example, if it is found that their contributions did not meet accuracy thresholds. With the present system, this may be done without the need to edit the database structure.

In one aspect of the invention, the data record manager (12) enables a platform client to merge two or more content sources to form a feed. Using the present invention, this can be done with little additional work.

Figure 3:
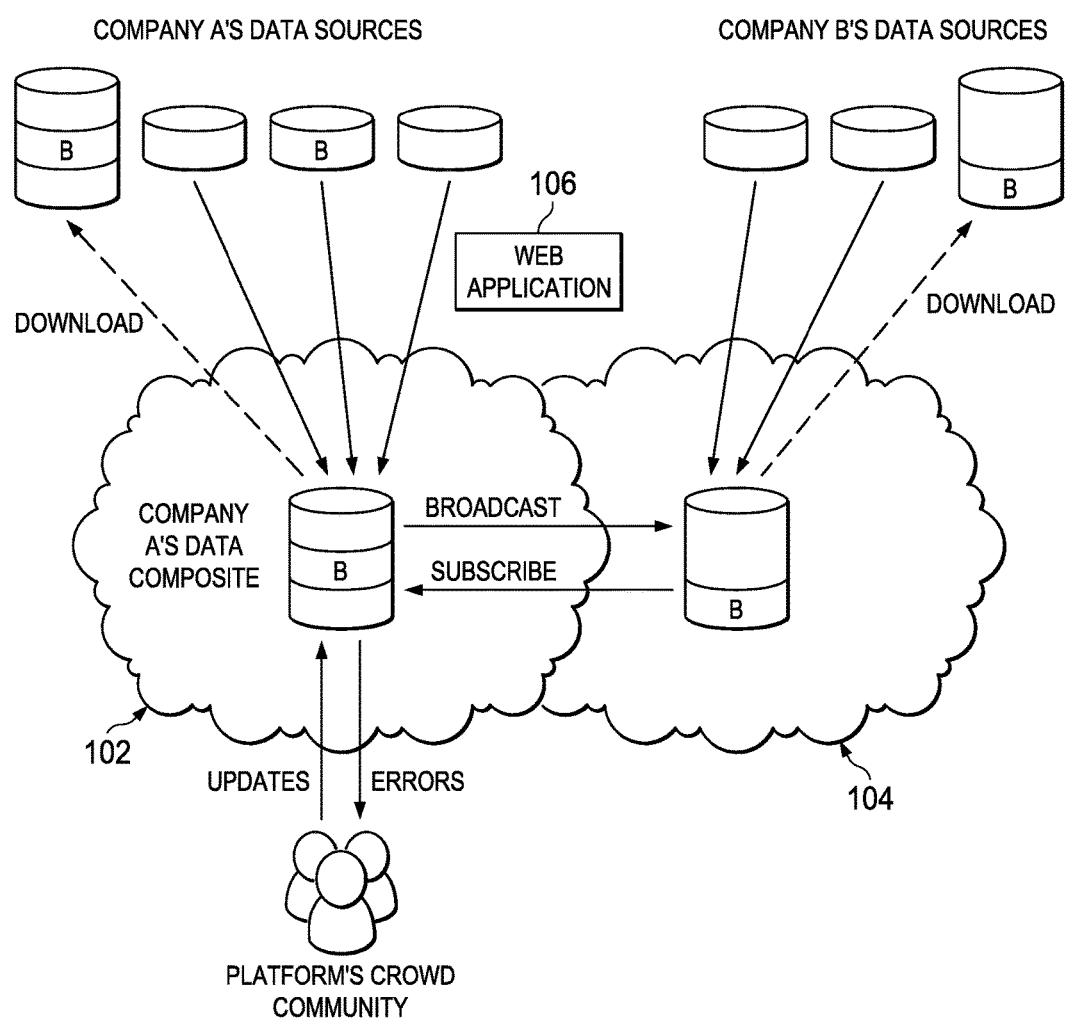
FIG. 3 is a further system diagram illustrating a representative implementation of the present invention.

In one aspect of the invention, the data record manager (12) enables platform clients to define a dedicated, cloud based data environment. FIG. 3 shows Company A that uses the web application (106) to create a cloud based content repository from multiple content sources (102). FIG. 3 also shows Company B that uses the web application (105) to establish its own cloud repository (104). FIG. 3 also illustrates sharing of content between Company A and Company B.

The data record manager (12) also includes a data exchange component (30). The segmentation that is possible using the platform (10) may also be used by platform clients to construct, dynamically, one or more feeds for selective exchange with one or more other platform clients. Platform clients may define as yet another attribute the parameters for enabling other platform clients to consume selected streams of their own information. The data exchange component

(30) may be implemented as an API. The data exchange component (30) enables platform clients who are subscribed to receive updates from another platform client to receive and use the updates immediately by subscribing to feeds, rather than requiring batch updates with the resulting delay and translation and/or data mapping.

Company A for example may establish parameters for subscribing to feeds that are based on content sources from another platform client, for example Company B. Also, the data exchange component (30) may also enable the dynamic broadcast of feeds to third parties, based on parameters defined by the sender. The parameters may include for example: (A) authorizing selected other platform clients to access particular data feeds, (B) determining the cost of data streams (including possible establishing premium feeds), (C) establishing a list of competitors who may not subscribe to the company's data feeds. A skilled reader will appreciate that many other parameters are possible.

The platform enables flexible delegation of activities (including outsourcing) such as data management and data cleaning.

The platform (10) significantly reduces the burden of managing multiple content sources. Content such as data across the platform (10) follows the same data format (through the universal data interface referred to above), and therefore data sources may be imported from multiple sources to form a private, cloud hosted data repository. In one aspect of the platform (10), it includes a series of utilities for providing a multi-tenant architecture where a plurality of platform clients can keep their information private and secure, and therefore their data repository is segregated from other clients' data repositories. However, the platform (10) is also configured to enable the sharing of information between platform clients when they agree mutually to this, including on an attribute by attribute basis, and dynamically. This results in more flexible data sharing arrangements, and also flexible outsourcing of data related activities such as correction or verification. Rather than operating in isolation, platform clients may co-operate based on mutual interest to build economies of scale through the platform (10). A skilled reader will appreciate that rather than integrating new data records from a third party on a batch by batch basis, with the resulting delay, and integrating these data records to an organization's data format, a platform client subscribes to a feed and thereafter updates are broadcasted dynamically through the platform with no integration requirements whatsoever. This is a completely new and innovative approach and technology with tremendous implications for the industry.

In one implementation, the present technology enables for example the synchronization of business contact information from multiple sources. For example an organization with better, more up to date information in certain geographic areas can partner through the platform (10) with one or more other organizations with up to date information in other geographic areas so that they can each improve the reach and quality of their data offering, or can develop joint offerings that maximize revenue for all participants. A skilled reader will immediately understand that many types of collaborations or partnerships are possible using the platform (10).

Anchoring Process

In a particular implementation of the present invention for business location data, the data exchange component (30) uses a process called "anchoring" to enable the seamless exchange of data for the same place. Most local business profiles were collected in various ways and don't have the same name, address and telephone details. Previously, parties that wanted to exchange data with each other would need to undergo a relatively expensive matching process to determine which profiles in one database were equivalent to a corresponding profile in the other database. The platform (10) makes it easy to exchange data on the same place by "anchoring" profiles to a reference file for that location managed by the operators of the platform (10). This protects each party's profile details while enabling them to later exchange data with each other. The anchoring process is done whenever a new profile is added to a repository so that whenever two parties want to exchange data with each other the platform (10) already knows how to match up their profiles.

In another aspect of the invention, if the platform (10) discovers a new location that doesn't already have a reference profile, it can, at the option of the platform client, create a reference profile with basic public details like name, address, telephone, and lat/long to identify it. If the platform client creates a reference profile, it can also specify whether it's visible or invisible. Editors and programmers associated with the operator of the platform (10) may improve anchoring by reviewing those basic details of visible anchors to suggest that anchors that relate to the same location be merged. Platform clients also have the option to create invisible anchors and rely solely on one or matching operations that may be embodied in the data exchange component (30) and/or the APIs provided the platform (10). This keeps the basic details of these new locations a secret to other users, the trade-off is that fewer profiles will be matched to others, reducing the efficiency of the data exchange process. If a platform client deletes a repository, all reference profiles unique to that repository and not anchored to other users' profiles will also deleted.

Mapping Process

The data exchange component (30) also includes a mapping process that further explains the implications of the platform's architecture and also the content profile structure. The mapping process makes it easy to exchange data, using the platform (10), between different formats and to enhance data from multiple content sources. Before the platform (10) of the present invention, publishers for example needed to map the fields of their content source to each new content source. If they used 50 sources, they would need to map their fields 50 times. With the platform (10) the mapping is made once for each data source to the universal data interface referred to above, regardless of the number of content sources.

Each content repository that is a data repository containing business directory data typically contains standard details used by other publishers (e.g. name, address, contact details, categories, product, prices, etc.). The server application (106) presents one or more specialized web objects enabling platform clients to map the fields in their data sources to the platform's universal data interface. In one implementation, a platform client having data sources with a structure or format different from the proprietary framework of the operator of the platform (10) embodied in the universal data interface, will map their data sources to the universal data interface ("inbound") and from the universal data interface ("outbound"). Once this has been completed, a platform client can exchange and integrated content automatically regardless of the native source of the information. In a particular aspect of the implementation if a content source includes specialized fields that have no equivalent in the extensive attributes of the present invention's framework, then the platform client may request that this be created, or optionally a specialized publisher-to-publisher mapping may be performed.

Each content repository generally has a specific schema that is generally created from the file that was used to upload the content to the platform (10). Once these schemas are created, users can visualize data from any feed in any of their schemas. This makes it easy to convert content from one format to another. In order to map content repositories to the universal data interface, a platform client uses the tools provided by the server application (16) (may be implemented as web screens associated with the data record manager (12)) to map each content repository schema into attributes of the universal data interface. This simplifies the data exchange process. For example, you might map your "Phone" field to the platform's "Telephone" attribute. Once these mappings are done, it is possible to exchange data with all participants who have performed the same mapping. In one implementation, the platform (10) supports mappings in and out of complex objects using Javascript.

In one implementation, the universal data interface can include thousands of attributes that can be used to map typical profile data.

Transaction Utility

Referring to FIG. 1, the system may further include a transaction utility (32) which may be configured to credit and debit accounts for content sources and content subscribers dynamically based on distribution. In an embodiment, the transaction utility (32) may keep track of a net balance as between two subscribers that exchange content with each other, such that a net balance as between the two subscribers may be tracked. The data tracking module (18) may be linked to the transaction utility (32) in order to enable tracking of various uses of data sources in order to enable the crediting and debiting of accounts as described.

As noted above, at the present time, organizations from many different industries use local business data in their operations. Each organization has unique business needs that typically require them to use data from various sources, and managing and merging this information can be a significant burden for organizations with limited resources. Similarly, with organizations managing their local data independently, it becomes difficult to distribute information to all simultaneously.

While organizations might consider some parts of their local business information to be proprietary, other parts are in the public domain. Given the scale of the problem in keeping global data current, the inventors have realized the benefit of a system where organizations agree to share updates with others if updates were similarly shared with them, and the organizations are able to maintain control. Previously, this couldn't be done because there wasn't a common identifier for each place of business, and because many publishers of this information used many different standards and formats for this information.

Fundamentally, a content consumer (say a company wanting to use directory data) is interested in the best possible data. The best available data (most accurate, most recently updated, most "trusted") may come from multiple sources, and based on these criteria the best source of data may vary from time to time. Also, a content consumer's prioritization of categories of data or in fact items of data may also vary. For example if a firm is running a priority marketing campaign in New York within a defined time, the firm may prioritize certain data at that time which may drive, for example, selecting premium sources of data or in this case (by operation of the content distribution network) consuming (and paying for) premium data dynamically.

From a content owner perspective, some of them have relevant data but they want to be able to control its use. For example ensuring that data is used only in connection with records with certain, criteria—e.g. accessible to a specific company only, not accessible to "competitors" and the like.

Providing this kind of control makes new data available from the content consumer perspective. From the content owner's perspective it enables them to find new customers for data, and enables the provision of access to their data possibly in a more refined way, with premium charges for certain entities or based on demand.

The owner of the network, or content subscribers to data compiled by or for the owner, will have better information regarding demand for specific data, optionally for specific purposes, from specific entities or entities in particular categories. This enables data compilers to direct their data collection, aggregation, and/or correction more efficiently.

Other Applications

A skilled reader will appreciated however that local business data is but one application of the platform of the present invention. Other content may be managed and distributed using the network of the present invention.

Generally speaking content that may benefit from distributed creation or management may be created or managed using the content distribution system of the present invention. For example, medical records may be developed using contribution from multiple stakeholders, while safeguarding personal health information, using the platform of the present invention.

Corporate records may be assembled from multiple sources and shared with multiple subscribers using the present invention.

Multiple parties may share and update profiles such as credit profiles or employee information for users using the platform of the present invention.

Examples of Implementation

An illustrative use of the present system and method for providing a content distribution network in the context of location information for various business owners will now be described.

In this illustrative use case, a number of publishers of content can upload various feeds and manage them in a content distribution network. For the purposes of the present discussion, the content distribution network is described as a "Content Management and Distribution System" or "CMDS". As noted above, this CMDS can take advantage of the inventors' previously described shared data and tools. Publishers can download a bulk copy of their data every night or perhaps access a delta file on a more real-time basis.

If a publisher represents a local business owner (in this case, the publisher may be referred to as a "Profile Manager"), then the publisher will be able to update the business owner's data in CMDS on behalf of that local business owner.

As noted above, the publisher can create feeds and manage them in CMDS. The CMDS allows for distribution of feeds to content subscribers on the CMDS.

In an embodiment, the feeds may have various characteristics including confidentiality. For example, a feed can be kept private for the publisher's own use, which may be useful for sandboxing and overriding data. For example, a publisher could create a private feed and store data in it to override external data.

In another embodiment, feeds can be shared by more than one publisher in a subscription model. The creator of the feed can let others use the feed, but may restrict what they can do with it. For example, publishers could create restricted feeds to distribute their photos, videos, or even real-time inventory to others.

In an embodiment, publishers could also provide composite feeds made up of more than one other feed and managed in a Feed Subscription Group (described below). Using the transaction utility, these feeds may be monitored to manage billing and share in the revenue.

In an embodiment, publishers may also subscribe to feeds created by others. Each publisher can manage the ranking of their owned and subscribed feeds so that each place profile has a composite view showing the value for each attribute that has the highest priority. By ranking feeds in this way, the publisher controls the composite data for every profile.

In the present system and method, data in CMDS provided by content sources become feeds available to be consumed. In an embodiment, content subscribers may subscribe to available feeds for updated data, but the present system and method controls who can update it. This is described in more detail further below. If a publisher wants to share a data field so they can get updates on it (from the community, or from a local business owner, etc.), CMDS could import this into a specialized feed for this purpose.

In an embodiment, the CMDS feed contains global shared data updated by business owners, publishers, and the community. It can be described as the "master feed" to which the other feeds are mapped. The CMDS controls read/write access to this mater feed in order to maintain quality control. CMDS may permit edits in one of three ways:
  i. Official Data: if the publisher is a profile manager and represents a verified business owner, then updates from that business owner may be marked as official and will update/overwrite the data.
  ii. Community Corrections: end users will still be rewarded for finding and fixing errors. They can make corrections to those fields and the corrections will be reviewed by the business owner if the profile is claimed, and if not, by the shareholder of the fields.
  iii. Community Verified Data: These are corrections made upon publisher request. As described below, if the publisher so requests (which may incur an additional fee), they can ask that fields mapped to the master feed be verified by the community. For example, there may be two possible telephone numbers for a profile and the result of the community verification process may update the data field in the master feed.

In another embodiment, CMDS could allow content subscribers to a feed to make suggestions to update specific fields.

An illustrative example of a feed will now be described. In an embodiment, publishers can create feeds which have the following parameters:
  i. Feed Administrator—the "owner" of the feed
  ii. Feed Name—to identify it in various lists
  iii. Status—active/inactive
  iv. Visibility—whether the feed is visible to all publishers in a list of all available feeds
  v. Exportable—whether publishers may want to prevent the whole, or parts of their feed from being exported
  vi. Subscription Type: the administrator can set who can subscribe.
    1. All—anyone can subscribe
    2. Approval—anyone can request to subscribe and administrator approves
    3. None—nobody can subscribe (kept private)
  vii. Suggestion Type—whether users can make suggestions for that feed (None, Subscribers, All)
  viii. Read Permissions Type (Subscribers only, Subscribers & Community, All)
  ix. Write Permissions Type (Geo or Business): the administrator can set the read/write editing permissions for each "node" in the place graph for profiles in the particular feed. (Feed permissions discussed separately below).

In an embodiment, in CMDS, publishers can subscribe to various feeds (ones they administer and ones administrated by others). Publishers can view their Feed Subscription Group where they rank the feeds to which they subscribe. Setting a feed with a higher rank means that when retrieving an attribute that exists in multiple feeds, then the output value is the data field from the feed with the highest rank.

In an embodiment, feed subscription groups may be formed in CMDS. The purpose of subscription groups is for publishers to create composite feeds from multiple content sources. The subscription group can decide (1) which data feeds they want to obtain data from, and (2) their relative rankings—i.e. which data feed they consider to be more accurate in the event that multiple data feeds contain the applicable field. Within the feed subscription group, the publisher will see all the feeds to which they're subscribed.

In an embodiment, in CMDS, publishers can create multiple subscription groups per account and switch them between "testing" and "production". They can re-map their API keys to a different subscription group so they don't have change their production API key.

In an embodiment, a publisher may set up various feed permissions. For example, a basic permissions framework may include permissions for reading the feed, and whether the feed is for "subscribers only". If the latter, only content subscribers can read the feed, data is not visible inside the site to editors, or outside the site to search engines. Alternatively, the permission may be for "subscribers & community", whereby the data is visible to content subscribers and to editors inside the site. Finally, the permission may be for "all", where data is visible to all content subscribers, editors and externally to search engines.

In an embodiment, feed administrators can always edit their feed. However, various levels of permissions may be set. For example, a user can edit an attribute if the feed administrator has given them edit rights to that attribute on that node or on any parent node. For write permissions, each place profile in an CMDS feed is assigned to a geographical hierarchy (and also to a business hierarchy). The geographical or "gee" hierarchy is the geographical hierarchy of the world, such as: →country→province→city→neighbourhood→street→building→floor. The CMDS may control the depth of the hierarchy to control how specific a feed should be.

In an embodiment, a business hierarchy may be used. For example, the business hierarchy may comprise a parent-→child mapping of a business organization or structure. For example: Head office→divisional manager→local manager→store manager.

As an illustrative example, through enumerations, CMDS can map all Starbucks locations or places to a master Starbucks Business profile (i.e. Head Office profile). Later, business owners, after they've claimed the master profile will be able to create further, more granular subdivision in the business hierarchy to represent their internal divisions and assign the proper managers to control aspects of their data.

For each feed, the administrator can set the permissions type to be either Geo or Business. Based on this hierarchy, the feed admin can assign one or more users as responsible for editing any node and by definition, any user assigned to a parent node, can edit or assign editors to any child node.

In an embodiment, to help feed administrators and business owners visualize it better, each node in a hierarchy can show the superset of attributes for profiles below it. One or more users can be assigned as editors to any attributes, and by default for any child profiles below that node. For example, a restaurant chain could use this system to delegate their photos and videos in Ontario to an ad agency in Toronto, and their menus for Canada to their marketing agency.

In an embodiment, CMDS can use the "Business" type for its feed and assign editing permission to the profile managers who represent those businesses. The business' head office could grant permissions to different organizations (ad agencies, etc.) to change certain attributes. For example, the head office of HotelsCombined might, for example, decide to use geographically based permissions, and assign roles based on the location of certain publishers that use its feed.

In another embodiment, the feeds may contain various attributes based on a master schema. An attribute can belong to one feed at a time. By using attributes from a master schema, publishers can take advantage of CMDS's ability to handle multi-language and conditional sub-attributes (e.g. restaurant→cuisine, etc.).

In addition to the usual information, CMDS may need to be able to set the following as well:
i. "Feed ID"—a unique identifier for a particular feed.
ii. "Mapping Group ID"—an attribute group representing attributes in various feeds that are mapped to each other.
  1. The field and its options will be mapped to the attribute in the CMDS feed.
  2. Since these mappings are used for data export, the attributes need to be the same type (i.e. string, single select, multi-select, etc.) or have the same number of options. The management of this could be left up to the feed administrator.
iii. "Official"—for the CMOS feed, whether the update is from the business owner.

In another embodiment, the feed administrator can assign an attribute in their feed to a mapping group. An attribute can be assigned to only one mapping group. A mapping group has an "anchor" which is the field to which the others are mapped. This would be typically an attribute in an CMDS feed (although it's possible that mapping groups could be created between two publishers without referencing the CMDS feed).

The mapping group ultimately determines for each content subscriber which attribute value is returned based on that content subscriber's ranking of their feeds. For example: the administrator of a Hotels feed might assign their phone field to CMDS's Telephone field. It's possible that a separate search index for all data within a mapping group may be needed.

In an embodiment, data loaded to the CMDS by various content sources may need to be cross-referenced and matched together. To do this, CMDS can pair them with the corresponding place profile in the CMDS feed, effectively stating that they are both referring to the same place. This can be enabled by assigning the attributes in a feed for that place to a CMDS place ID.

In an embodiment, matching only takes place on attributes within a mapping group. For example, fields like place name, address, telephone, latitude and longitude must be mapped to each other. The matching algorithm may be a boolean formula based on comparing the mapped fields. For example, if a $3^{rd}$ party ID exactly matches, then it's a match; otherwise if name, address and lat/long are a 95% equivalent match, then that could also be assumed to be a match.

In an embodiment if an incoming place matches an existing CMDS place (as described by the matching algorithm above), then the publisher's data is appended to the existing profile for that place. However, if the incoming place does not match an existing place, then a new profile is created. It's technically possible that none of the data on that profile would be visible to a particular viewer.

In an embodiment, it's possible that the matching algorithm gets it wrong and a new place is added when the data should have been appended to an existing profile. In this case, provided that the profile has shared data, then users or other publishers would be able to flag the profile as a duplicate (as users currently do now), and after the correction is processed and approved, the data on the two profiles may be verified and merged if shared data), or appended (if private data).

If data might have been incorrectly appended to a wrong place, the publisher (or the community, if the data is visible to them), can rematch and append that data (a group of fields) to the correct profile. If data might have been incorrectly appended to the wrong place, but the correct profile doesn't yet exist in CMDS, a new profile may be created and the data rematched and appended to the new profile.

In an embodiment, when a publisher requests data for place, they may receive a composite profile for that place with data from all of their subscribed feeds. For attributes which are inside a mapping group, one or several are returned based on priority determined from the feed with the highest rank, or based on a rule-based evaluation of the content.

To simplify things at the start, CMDS can support a feature to return data in name:value pairs, so the feed content subscriber doesn't need to worry about the type and format of the attributes. For instance, whether it's Wifi:Free (string), or Wifi:Free (option 2 of 3), it can be returned for display as a name:value pair (Wifi:Free).

When a publisher submits new data to be persisted, CMDS can look-up the applicable permissions and make the following determination: (i) Reject the data: if the user has no right to edit or make a suggestion. (ii) Submit the data as a suggestion: if the user has the right to make a suggestion but not edit it. Alternatively, if the user has the right to edit, the user may overwrite the data: In an embodiment, a feed administrator may want to make a suggestion to themselves to view within the web UI.

In an embodiment, a publisher may realize that data in a feed is different from data in the FMDS feed. In this case, it may request a verification via API (which will create a mission for the community to verify the two fields). The publisher will pay a fee if the CMDS data was correct and the publisher's data was wrong. The verification will be free if the CMDS data was incorrect. The CMDS data will be updated accordingly.

In an embodiment, a publisher may update the CMDS data provided that the publisher/profile manager was assigned the appropriate permissions (i.e., if the incoming data is "official"). In this case, the publisher is able to update and overwrite the shared CMDS data. (Only Profile Managers acting on behalf of verified owners are permitted to mark data as "official").

In an embodiment, CMDS incorporates the ability to easily create "overrides" for certain fields. To do this, a new feed can be created and given the highest rank. When the new feed with higher rank is added, this new feed with a higher rank automatically overrides all other feeds. In an embodiment, publishers can retrieve a delta of changes made via an API.

Publishers can decide which data to retrieve (official data vs. CMDS shared data) based on the prioritization mechanism described above.

By way of illustration, the CMDS may incorporate a user interface (UI) comprising the following UI pages:
Feeds
  Table of your feeds
    For each feed, view the name, admin, type, visibility, stats, pending approval, etc.
    Set the ranking for each feed
    Delete feeds that you've created
    Unsubscribe from 3rd party feeds
    Manage a feed
    Feed content subscribers (manage/approve list of content subscribers to the feed)
  Get your API key that retrieves your composite feed
  Link to create a feed
  Link to subscribe to a feed
  Link to API docs
Create A Feed
  Enter the details in a form, hit submit
    Assigning attributes to feeds and setting the feed schema will take a bit of work to make it easy for 3rd parties to use. We'll do this manually at first for our demos/trial partners
Subscribe To A Feed
  View list of visible available feeds, select desired feeds
  Enter name of an invisible feed (to see whether you can subscribe to it)
Manage A Feed
  Edit Mapping Groups
    View existing Mapping Groups, create new Mapping Groups (set anchor)
  Edit Schema & Attributes
    Need easy to use UI to do through the website what can be done via an administrative interface (e.g. Mooadmin editor)
  Manage Your Feed Content subscribers
    View subscription requests (approve/reject)
    View table of content subscribers (disconnect a content subscriber)
      Per content subscriber stats
    View recent feed edits by content subscriber?

In an embodiment, the value of the various feeds to be returned to the user depends on the feed rank and the attribute weights. For more granular weightings, they can set the attribute weight which may override the feed rank. For example, the HC feed may outrank the WCT feed except for the website field in the WCT feed which is determined to be better by the feed admin and is assigned a higher weighting.

In another embodiment, for every field in the CMDS, the format of the incoming data (from various publishers or feeds) may or may not match the format stored by CMDS. In this case, the data needs to be transformed or normalized into a standard format suitable for storage by CMDS. These transformation rules should be configurable by the end user from a front-end interface. Alternatively, they may be configurable from the back-end. e.g. incoming phone numbers in format (aaa) bbb-cccc can be transformed into aaabbbcccc format.

It should be understood that various other methods result from the operation of the platform, with its various features and utilities, as described in this disclosure.

(i) System Implementations

A system, in accordance with an embodiment may be implemented using a distributed and networked computing environment comprising at least one computing device, in a particular implementation, at least three sets of computing devices may be provided. Each set of computing devices may comprise one or more computing devices linked by a network. Typically, at least one set of computing devices would generate and send the records over the network to a second set of computing devices. The second set of computing devices receives the records and may provide information, or correct or verify information includes in the records. However, it should be understood that the generation, correction, or verification of information, may be processed on any number of computing devices from one to many.

At least a third set of computing devices may be used to obtain or receive the information, including information in an aggregated form, for further staging, analysis, synthesis, consumption, or other use thereof. The use of the information may be user generated or machine generated.

(ii) Mobile Implementations

Further enhancements may be provided wherein one or more of the computing devices are mobile devices or wirelessly networked devices, for example as illustrated in FIG. 2. For example, the network may be or include a wireless network, the wireless network including a wireless gateway for linking the wireless network to the Internet. The network-connected devices as previously described may consist of wirelessly networked devices (50) that are operable to access the Internet via a wireless gateway (not shown). The wirelessly networked devices described may include a browser for interacting with the web server to access functions of the content distribution system (10). Alternatively, the wirelessly networked device (50) may include a mobile application (54), which may include one or more utilities or features providing the record completion functions that may enable crowd users to interoperate with the content distribution system, and specifically the crowd module (15) so as to for example complete records using the wirelessly networked device (50). In another aspect, the mobile application (54) may be configured to enable real time or near real time administrative functions, so as to enable for example modifications to data sharing relationships. The wirelessly networked devices could also be equipped with additional functionality for providing information regarding users that enables the targeting of particular users, including for example a GPS receiver operable to provide GPS location information to invite particular users to complete tasks or sub-tasks or to allocate tasks to particular participating users. The wirelessly networked devices may also include one or snore accelerometers or other movement sensors operable to provide movement-based or gesture-based information. Thus the messaging to be returned to the platform may include location, movement and/or gesture relevant content.

It should be understood that the wirelessly networked device as described may consist of a hand-held two-way wireless paging computer, a wirelessly enabled palm-top computer, a mobile telephone with data messaging capabilities, a portable digital media player, or a wirelessly enabled laptop computer, but could be any type of mobile data communication device capable of sending and receiving messages via a network connection. The majority of current mobile communication device users, however, use a mobile telephone with data messaging capabilities, such as server addressing capabilities such as Short Message Service ("SMS") or Multimedia Messaging Service ("MMS") or data including GPRS or 3G. The present system and method therefore provides means for providing the functionality described herein, from mobile communication devices that are relatively common and inexpensive.

(ii) Generic Implementation

Figure 4:
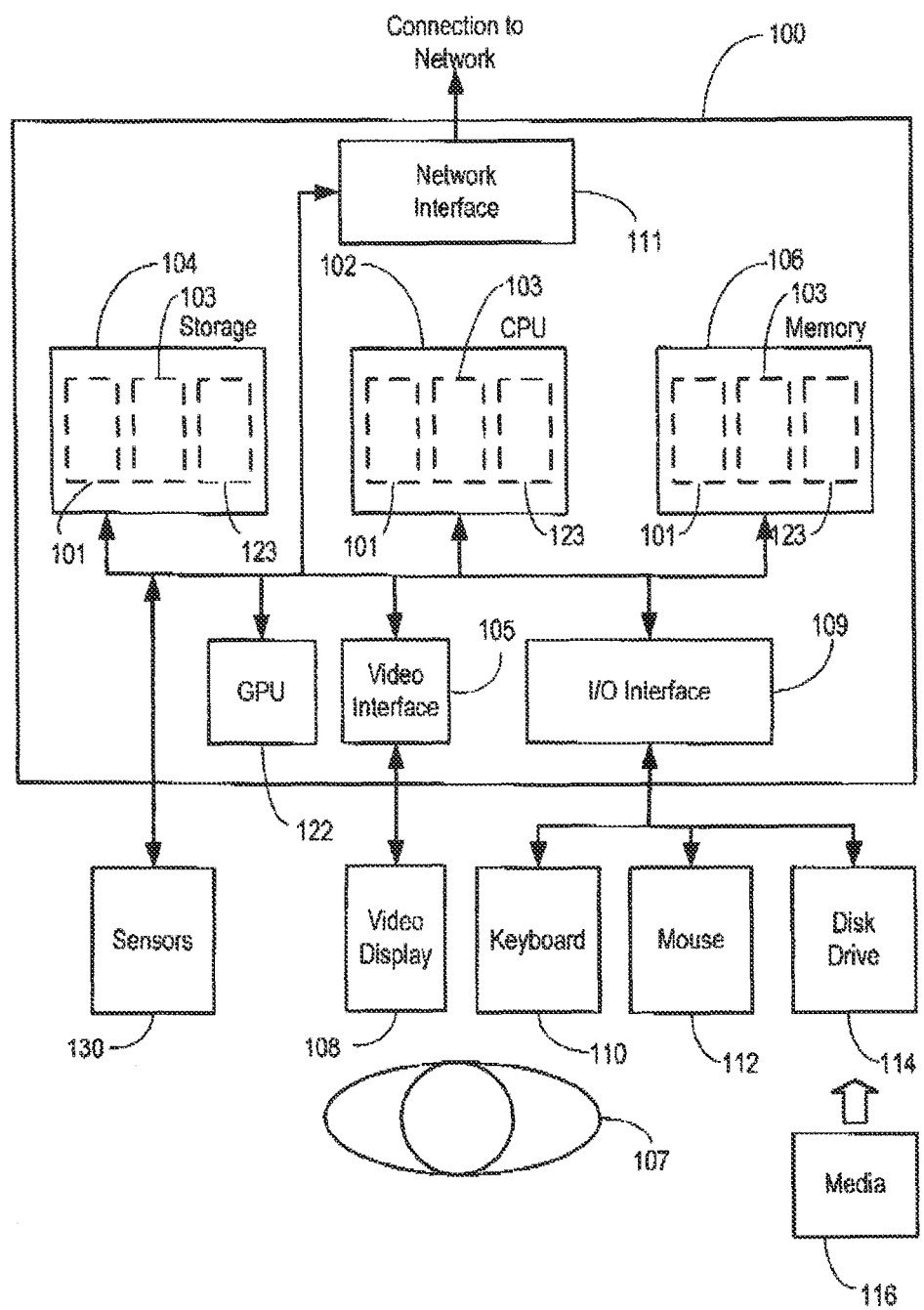
FIG. 4 is an illustrative diagram providing a generic computer hardware and software implementation of certain aspects, as detailed in the description.

The present system and method may be practiced in various embodiments. A suitably configured computer device, and associated communications networks, devices, software and firmware may provide a platform for enabling one or more embodiments as described above. By way of example, FIG. 4 shows a generic computer device 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. Computer device 100 may further include a graphics processing unit (GPU) 122 which is operatively connected to CPU 102 and to memory 106 to offload intensive image processing calculations from CPU 102 and run these calculations in parallel with CPU 102. An operator 107 may interact with the computer device 100 using a video display 108 connected by a video interface 105, and various input/output devices such as a keyboard 110, mouse 112, and disk drive or solid state drive 114 connected by an I/O interface 109. In known manner, the mouse 112 may be configured to control movement of a cursor in the video display 108, and to operate various graphical user interface (GUI) controls appearing in the video display 108 with a mouse button. The disk drive or solid state drive 114 may be configured to accept computer readable media 116. The computer device 100 may form part of a network via a network interface 111, allowing the computer device 100 to communicate with other suitably configured data processing systems (not shown). One or more different types of sensors 130 may be used to receive input from various sources.

The present system and method may be practiced on virtually any manner of computer device including a desktop computer, laptop computer, tablet computer or wireless handheld. The present system and method may also be implemented as a computer-readable/useable medium that includes computer program code to enable one or more computer devices to implement each of the various process steps in a method in accordance with the present system and method. It is understood that the terms computer-readable medium or computer useable medium comprises one or more of any type of physical embodiment of the program code. In particular, the computer-readable/useable medium can comprise program code embodied on one or more portable storage articles of manufacture (e.g. an optical disc, a magnetic disk, a tape, etc.), on one or more data storage portioned of a computing device, such as memory associated with a computer and/or a storage system.

While the above description provides examples of one or more embodiments of the invention, it will be appreciated that numerous other embodiments may be within the scope of the present invention, as defined by the following claims.

The invention claimed is:

1. A computer system implemented method for distributing content using a content distribution network, the method comprising:

receiving, by one or more computers configured to manage content feeds in a crowd source campaign, a content feed, the content feed including a data record on a business entity at a geographic location;

mapping, by the one or more computers, the content feed to a first node in a hierarchical data structure, the first node representing the geographic location of the business entity, the first node being associated with one or more attributes and a parent node, the parent node representing a geographic region including the geographic location, the parent node being associated with a superset of the one or more attributes, wherein each attribute is an item of business information;

receiving, from a user through a dashboard provided by the one or more computers, an input editing an attribute of the content feed, the dashboard configured to enable management of the content feed in the crowd source campaign;

determining that the user has previously received permissions to edit content feeds corresponding to the geographic region corresponding to the parent node;

determining, based on data stored in the hierarchical data structure, that the attribute is in the superset of the one or more attributes;

in response to determining that the user has previously received the permissions and that the attribute is in the superset, editing the attribute according to the input; and transmitting the data record of the content feed to one or more subscribers.

2. The method of claim 1, wherein each attribute is associated with a respective rule of validation, the rule of validation relating to rules on whether data will be accepted to the data record.

3. The method of claim 1, wherein the attribute being edited is an anchor of a mapping group that maps one or more data fields to the attribute.

4. The method of claim 1, wherein the content feed is attached to a field priority attribute that specifies a priority of a data source of the content feed over other data sources of other content feeds.

5. The method of claim 1 comprising managing one or more crowd source campaigns for creating, managing or updating content using a crowd utility linked to the computer system.

6. The method of claim 1, wherein the content feed is attached to a profile filter specifying at least one of a business type, a location, or a connection type of a subscriber that is allowed to receive the feed.

7. A computer system comprising:

one or more computers configured to manage content feeds in a crowd source campaign; and at least one non-transitory computer-readable medium storing instructions operable to cause the one or more computers to perform operations comprising:

receiving a content feed, the content feed, the content feed including a data record on a business entity at a geographic location;

mapping the content feed to a first node in a hierarchical data structure, the first node representing the geographic location of the business entity, the first node being associated with one or more attributes and a parent node, the parent node representing a geographic region including the geographic location, the parent node being associated with a superset of the one or more attributes, wherein each attribute is an item of business information;

receiving, from a user through a dashboard provided by the one or more computers, an input editing an attribute of the content feed, the dashboard configured to enable management of the content feed in the crowd source campaign;

determining that the user has previously received permissions to edit content feeds corresponding to the geographic region corresponding to the parent node;

determining, based on data stored in the hierarchical data structure, that the attribute is in the superset of the one or more attributes;

in response to determining that the user has previously received the permissions and that the attribute is in the superset, editing the attribute according to the input; and transmitting the data record of the content feed to one or more subscribers.

8. The computer system of claim 7, wherein each attribute is associated with a respective rule of validation, the rule of validation relating to rules on whether data will be accepted to the data record.

9. The computer system of claim 7, wherein the attribute being edited is an anchor of a mapping group that maps one or more data fields to the attribute.

10. The computer system of claim 7, wherein the content feed is attached to a field priority attribute that specifies a priority of a data source of the feed over other data sources of other feeds.

11. The computer system of claim 7, further comprising a data exchange utility that enables a computer system user to define one or more rules governing distribution of feeds based on the computer system user's content repository or content repositories.

12. The computer system of claim 7, further comprising a transaction utility that creates for each computer system user an account linked to content repositories for tracking transactions based on consumption of content feeds or broadcasting of content feeds through the computer system, and processing transactions and crediting/debiting the account based on one or more transaction rules.

13. The computer system of claim 7, further comprising an analytics tool that enables computer system users to access analytics regarding demand for content via a content distribution network, and based on such analytics optimize their content creation, management, and distribution activities.

14. The computer system of claim 7, further comprising a crowd module that enables creation and management of one or more crowd source campaigns for creating, managing or updating content using a crowd utility that is made accessible to crowd users linked to the computer system.

15. The computer system of claim 7, wherein the dashboard is configured for each computer system user to enable management of respective content creation, content mapping, management and updating activities through the computer system, and subscriptions to feeds and broadcast of feeds through the computer system.

16. At least one non-transitory computer-readable medium storing instructions operable to cause one or more computers to perform operations comprising:

receiving a content feed by the one or more computers, the one or more computers configured to manage content feeds in a crowd source campaign, the content feed including a data record on a business entity at a geographic location;

mapping, by the one or more computers, the content feed to a first node in a hierarchical data structure, the first node corresponding to the geographic location of the business entity, the first node being associated with one or more attributes and a parent node, the parent node corresponding to a geographic region including the geographic location, the parent node being associated with a superset of the one or more attributes, wherein each attribute is an item of business information;

receiving, from a user through a dashboard provided by the one or more computers, an input editing an attribute of the content feed, the dashboard configured to enable management of the content feed in the crowd source campaign;

determining that the user has previously received permissions to edit content feeds corresponding to the geographic region corresponding to the parent node;

determining, based on data stored in the hierarchical data structure, that the attribute is in the superset of the one or more attributes;

in response to determining that the user has previously received the permissions and that the attribute is in the superset, editing the attribute according to the input; and providing the data record of the content feed to one or more subscribers.

17. The at least one non-transitory computer-readable medium of claim 16, wherein each attribute is an item of business information.

18. The at least one non-transitory computer-readable medium of claim 16, wherein each attribute includes a name:value pair.

* * * * *